United States Patent
Jacob et al.

[11] Patent Number: 5,286,557
[45] Date of Patent: Feb. 15, 1994

[54] COMPOSITE SHEET MOLDABLE MATERIAL

[75] Inventors: Karl I. Jacob; Jal N. Kerawalla, both of Greenville, N.C.

[73] Assignee: E. I. Du Pont de Nemours and Company, Wilmington, Del.

[21] Appl. No.: 971,152

[22] Filed: Nov. 5, 1992

Related U.S. Application Data

[63] Continuation of Ser. No. 606,664, Oct. 31, 1990, abandoned.

[51] Int. Cl.$^5$ .................... D04H 1/58; B32B 27/00
[52] U.S. Cl. .................... 428/288; 428/289; 428/290; 428/303
[58] Field of Search .............. 428/297, 292, 288, 295, 428/290, 303; 528/301, 302; 524/369, 311, 399; 523/508

[56] References Cited

U.S. PATENT DOCUMENTS

| | | | |
|---|---|---|---|
| 3,989,788 | 11/1976 | Estes, Jr. et al. | 264/120 |
| 4,263,364 | 4/1981 | Seymour et al. | 428/287 |
| 4,418,116 | 11/1983 | Scott | 428/288 |
| 4,419,503 | 12/1983 | Sublett | 528/302 |
| 4,483,976 | 11/1984 | Yamamoto et al. | 528/301 |
| 4,710,432 | 12/1987 | Nishimura et al. | 428/296 |
| 4,800,113 | 1/1989 | O'Connor | 428/175 |

FOREIGN PATENT DOCUMENTS 0310200 4/1989 European Pat. Off.
1-167370 7/1989 Japan.

Primary Examiner—George F. Lesmes
Assistant Examiner—James D. Withers

[57] ABSTRACT

Thermoplastic polyester fiber reinforced polyester panels which have extremely smooth and paintable surface and which can be deformed when hot to conform to a molded useful article without substantial loss in molecular weight or physical properties such as strength.

1 Claim, 1 Drawing Sheet

FIG.1

COMPOSITE SHEET MOLDABLE MATERIAL

This is a continuation of application Ser. No. 07,606,664 filed Oct. 31, 1990, now abandoned.

BACKGROUND OF THE INVENTION

This invention relates to fiber reinforced resin matrices and more particularly it relates to polyester fiber as the reinforcing fiber for a polyethylene terephthalate resin matrix. Plastic shells reinforced with fiber glass are used for certain applications such as automotive body parts or housings for tools or electronic equipment. The reinforcing fibers such as glass are cast or encapsulated in a matrix such as polyethylene terephthalate (PET) or polypropylene (PP).

There are several methods which are usually employed to form these structures. One such method uses injection molding of PET blended with a very short cut length of glass fibers. A second method uses a polyester in a solvent base which is sprayed into a mold, then laid up with glass, and then sprayed with another layer of polyester and a cross-linking agent to make this structure permanently solid. Yet in another method preform sheet is produced by consolidating (technically pre-consolidating) a mixture of glass fiber and PET or PP or by extruding PET or PP to a glass fiber mat. The sheet thus obtained is then vacuum formed or thermo-formed in a mold in a male female mold.

In all these techniques the PET has to be heated above its melting point to obtain conformance with the mold shape. Most homopolymer PET degrades very rapidly due to oxidation and hydrolytic degradation and looses it molecular weight and strength at this high temperature.

Hence, in all the above techniques, the moisture or oxygen has to be excluded from coming in contact with the hot polymer blend. This requires elaborate injection molding or blanketing or drying equipment or the use of antioxidants in the polymer.

SUMMARY OF THE INVENTION

This invention takes advantage of two fundamental properties of polyesters, namely, the degradation is most rapid at the melting point of PET (240° to 250° C.) in the absence of an inert media gas as is the case in most molding operations. It is also known that this degradation or strength loss is due to reduction in molecular weight caused by Chain Scission which declines rapidly with the reduction in temperature. The second property is the depression of the melting point of PET when copolymerized with isophthalates or glycols such as diethylene glycol (DEG). Surprisingly, this combination gives a copolymer PET matrix which can be reinforced with homopolymers PET fibers and neither the matrix nor the reinforcing fibers degrade significantly because the matrix can be melted and reconsolidated at lower temperatures. This invention involves a combination of matrix (binder) and reinforcing fibers such that the molding or the pre-consolidation temperature is low enough (220° C.) to accomplish molding without appreciable degradation of the matrix or the reinforcement. Specifically, when a composite of homopolymer PET matrix reinforced with glass fibers was molded, it had to be consolidated at 270° C. The glass remained intact but the polyester degraded from an intrinsic viscosity (I.V.) of 0.65 (20 LRV) to I.V. of 0.53 (13.5 LRV) and with this there was an unacceptable loss of molecular weight and strength. However, when PET was used as the reinforcing fiber and a copolymer of PET and 12.5 mole % DEG was used as the matrix and consolidated at 220° C., the matrix I.V. went from 0.667 to 0.627 retaining its strength and the PET reinforcing fiber I.V. went from 0.635 to 0.62 retaining its strength and giving a composite of very good strength ($7.9 \times 10^3$ psi) and modulus ($0.713 \times 10^6$ psi). Thus, the present invention specifies using copolymer PET fibers (with relatively low melt temperatures) as the matrix forming component so that molding could be carried out at temperatures below the temperature at which PET suffers significant molecular weight loss and accompanying loss of strength and stiffness.

Since both the binder matrix and the reinforcing polymers are both spinnable as fibers, they can be spun and blended, and air laid, carded, or wet laid as any other fibers and pre-consolidated into sheets which can then be heated and formed (molded) into useful shapes in a typical male/female press or a vacuum forming operation. The fiber blend as a mat can also be used, without preconsolidation, in a closed mold to form a useful article by subjecting the mold and its content to a complete heating and cooling cycle.

A further surprising advantage of this combination is that the surface finish of these composites is extremely smooth and it copies or surpasses the surface roughness of the mold. This is a result of the fact that unlike glass reinforcements PET conforms and retains the new configuration at low molding temperatures (about 220° C.).

BRIEF DESCRIPTION OF THE DRAWING

Figure 1:
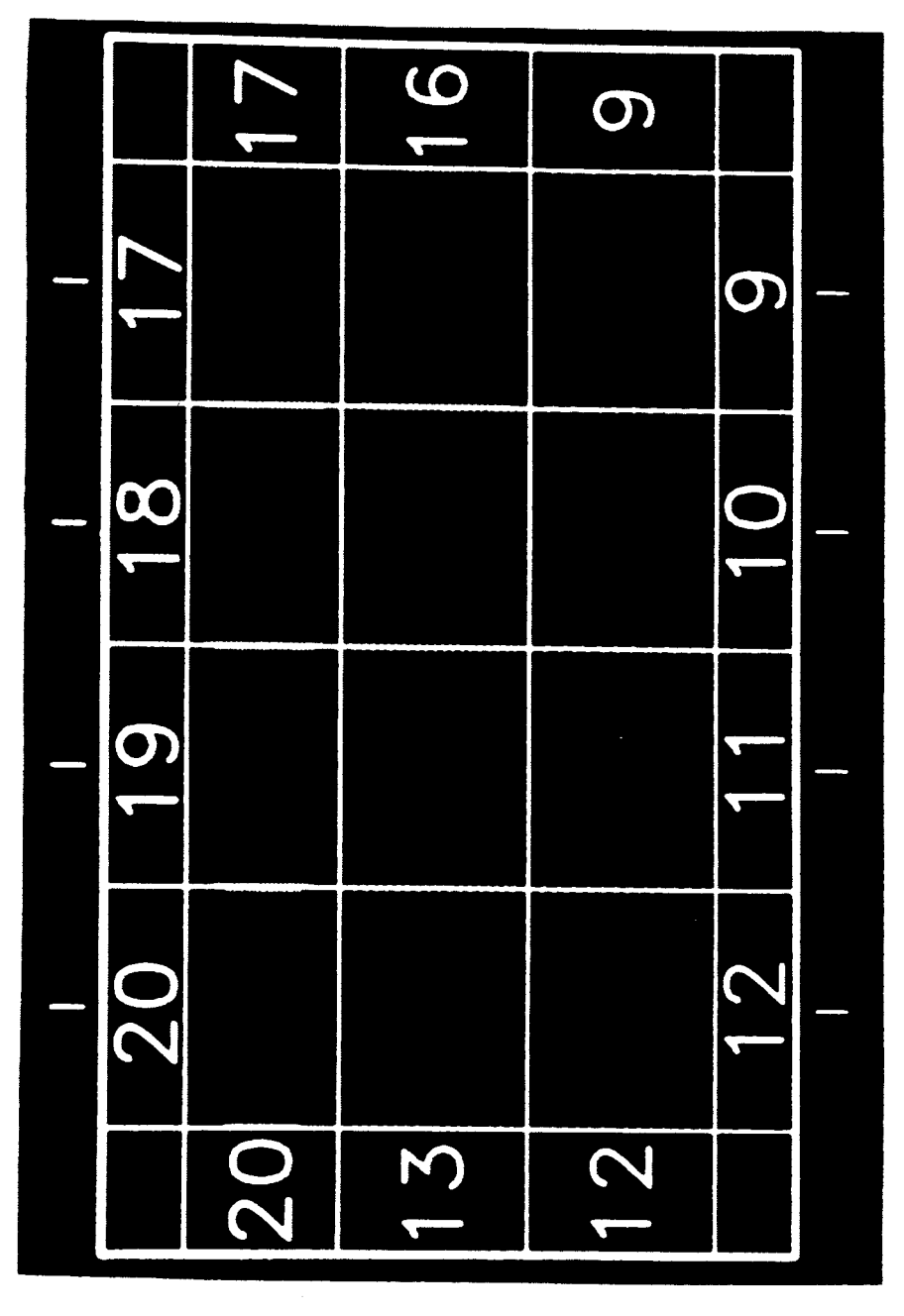

FIG. 1 is a photograph of the Tension Index for standard calibration surface.

DETAILED DESCRIPTION OF THE PREFERRED EMBODIMENT

The composite fiber mat is formed on a conventional card and then needle punched for structural integrity. The ratio of reinforcing fibers and matrix forming fibers in the mat to binder fibers in the mat could be adjusted by changing the feed rate of corresponding fibers. Though there is a preferred orientation in a carded mat, the extent of such orientation is not very significant and, for all practical purposes, the mat is considered as quasi-isotropic.

The reinforcing fibers used in the present invention consists of homopolymer staple fibers of 1.5 to 7 dpf (preferably 5.5 dpf) and cut length of 1" to 2.5" (preferably 1.5" long). These fibers usually have moderate crimp. Fibers of different geometry and differing number of holes (solid fibers to 4-hole fibers) were used in the present invention. These fibers are surface treated by a finish for better handling during carding or wet laying.

The binder (or matrix forming) fibers are lower melting copolymer fibers usually, but not exclusively crimped, of cut length 1" to 2.5" and 1.5 to 3.5 dpf. Binder fiber content in the mat is kept between 50% to 75% by weight. Better properties are observed when the binder fraction is 70%.

Several needle-punched pre-form mats are stacked to produce necessary thickness to make composite parts. It is found that better surface properties are obtained when a thin layer of binder fiber is placed on the outside of the fiber mat stack to be molded.

BLENDING PROCEDURE

For large quantities of fiber blend, the cutter blender technique is used in which blending is done along with cutting on a Lumnus cutter. The reinforcing fibers and binder fibers are passed through two cutter reels, each adjusted to produce staple fibers of required lengths, running at different speeds adjusted to obtain the required weight contribution of reinforcing and binder fibers in the blend. The cut fibers are collected in the same container. The blend thus obtained is reasonably uniform; however, by using a blender better uniformity is obtained.

GARNETING AND NEEDLE PUNCHING

Fiber blend obtained by the above-mentioned techniques are passed through a Garnet/Card and then through a needle puncher to form 22" wide ⅛" thick bats.

MOLDING PROCEDURE

About 80 grams of fiber mat (usually 5–7 layers) was stacked in a 7×7" picture frame mold coated with silicone. No attempt was made to dry the fiber blend prior to transferring fiber blend into the mold. The mold unit was then placed in a hydraulic press (Pasadena Hydraulic Press model B-230, 50 T capacity) whose plates were kept at a temperature 15° to 25° C. above the melting point of the binder fibers. The mold was kept between the plates under a 10 ton load for 15 minutes. The heat was then cut off and cold water was passed through the assembly and the mold was allowed to cool to a temperature below 100° C. The mold was then taken out of the press and the composite plaque was pushed out of the mold using a 3 ton Arbor press. Specimens were cut out from the plaques for tensile and blending measurements. These composites are extremely tough with high resilience and good surface characteristics. Average blending modulus and strength are calculated from several specimens.

TEST METHOD FOR SURFACE SMOOTHNESS

A tension meter, manufactured by PPG Industries, is used to characterize the surface smoothness (or roughness) of composites. The Tensio'n instrument is first calibrated on a smooth and even standard surface supplied by PPG. The instrument is placed over the surface and a Poloroid picture is taken by activating the flash. The picture thus obtained has 12 regions or rectangles. The rectangle designated by number 9 has widely spaced lines but the one corresponds to number 20 contain lines which are closely packed.

For the standard smooth surface, the lines in the rectangle 20 do not touch each other and are distinctly visible. These lines in the picture are images of a grid reflected on the surface of the composite, thus the finer the visible in the picture the better the surface. The Tensio'n index corresponds to the number assigned to the rectangle containing the closest packed which do not touch each other. Thus, the Tensio'n index for the calibration surface is 20.

After calibration, the instrument is placed over the composite sample and a picture is taken, and the Tensio'n Index is identified by reading the number assigned to the rectangle containing the finest and closest packed lines which do not touch each other.

TEST FOR DETERMINING BINDING MODULUS AND YIELD STRENGTH

ASTM D790-71 is the standard used to determine binding modulus and yield strength wherein a four point bending test is applied to evaluate bending modulus and yield strength of PET/PET composites. Samples used are of 1 inch width and usually about ⅛ inch thickness. The bending modulus is evaluated from the slope of the tangent of the initial part of the force-deflection curve. The yield strength is evaluated by finding the force required for a significant yield of the specimen under the four point bending condition and evaluating the maximum stress using the linear theory of bending.

TEST FOR DETERMINING INTRINSIC VISCOSITY (IV)

The intrinsic viscosity of PET or its copolymer derivatives were determined by measuring the solution efflux time in a calibrated Ostwald-Cannon-Fenske modified viscometer using a 0.32% solution of PET dissolved in a mixture of 25 parts of tri-fluoroacetic acid and 75 parts of methylene chloride.

EXAMPLE 1

We obtained a uniform blend by carding crimped 5.5 dpf PET homopolymer fibers (T-374, 4-hole round) and crimped 3.75 dpf PET copolymer fibers (T-171, PET, DEG with 12.5% DEG) both 1.5" long, and needle-punching the nonwoven mat. The blend ratio (reinforcing fiber/binder fiber) was 30/70 by weight. The fibers had a standard textile lubricant antistat for processing on dry or wet laid equipment. The intake of reinforcing fibers and binder fibers is controlled to obtain the mat of required blend ratio. The dry mat weight was approximately 0.08 lbs./sq. ft. This mat was needle punched to a thickness of ⅛".

The nonwoven sheets are then stacked to form 7×7" batt of weight approximately 0.6 lbs./sq. ft. The mat is transferred to a 7×7 picture frame mold coated with standard mold release (silica) agent. The mold is closed and placed between the platens of a hydraulic press. The platens were kept at a temperature of 230° C. The mold and its contents are kept between the platens at a pressure of (15T/7×7") for approximately 15 minutes before water is allowed to circulate through the platens to cool the mold and its contents to a temperature to 80° C. Cooling process is started when the evidence of flash is sighted, if it happened earlier than 15 minutes. The composite plaque is then removed from the mold and is tested for its strength, modulus, and surface smoothness. The T-374/171 composite has a bending modulus of 720,000 psi and yield strength 5,400 psi in one direction and 75,000 psi in the other. The surface smoothness under (Tension index) was 16. By using "KAPTON" sheets on both sides of the mat before molding and removing these sheets after molding, the surface smoothness was improved. The Tension index for composites formed using a Class-A mold or by using "KAPTON" sheets was 18.

EXAMPLE 2

The procedure is identical to Example 1 using a composite preform layer composed of homopolymer PET reinforcing fibers and isothlate copolymer binder fibers (T-374 and D-262 fibers with 5.5 and 3 dpf, respectively; D-262 contains 30% of polyethylene isothalate).

Molding temperature (235° C.) and molding time (20 minutes) are slightly higher compared to DEG copolymer binder fiber composites for 30/70 reinforcement/binder blend ratio. Isothalate composites provided a modulus of 700,000 psi and yield strength of 7,500 psi. Surface properties are excellent. The Tension Index for composites, without the use of "KAPTON" sheets was 15.

EXAMPLE 3

The procedure is identical to Example 1 using a composite preform layer composed of drawn PET as reinforcements (T-374) and undrawn PET (T-611, 6 dpf) as binder fibers (40/60 by weight). Molding is carried out at carefully controlled temperatures sufficient enough to melt the undrawn fibers while leaving the drawn fibers mostly intact. The Tension Index for the surface was 12, T-374/611 composites developed a bending modulus of 500,000 psi and having strength of 11,000 psi.

EXAMPLE 4

The procedure is identical to Example 1 using non-woven sheets composed of PET reinforcing fibers (T-374) and isothalate (2GI) sheath-core copolymer binder fibers (D-269, PET/2GI/PET 50//50, dpf 4.0) in 30/70 ratio by weight. The molding temperature was slightly higher, 245° C. T-374/171 composites developed a modulus of 650,000 psi and strength 9,000 psi. The Tension Index for composites molded without using "KAPTON" sheets was 12.

EXAMPLE 5

The procedure is identical to Example 1 using a composite preform layer composed of PET fibers (T-372 solid round, dpf 1.5) and PET copolymer fibers (T-171) in 40/60 blend ratio. The bending modulus of resulting composite was 550,000 psi, and the bending strength was 11,000 psi. Tension Index of the surface Was 13.

EXAMPLE 6

The procedure is identical to Example 1 using a composite fiber batt composed of high IV 0.9, mid shrinkage, industrial PET yarn (uncrimped, 1.5" cut length) and a needle punched fiber blend of T-374 and 171 at 30/70 weight ratio. The preform fiber batt is obtained by stacking alternate layers of industrial yarn and T-374/171 fiber blend at 25/75 weight ratio so that both sides of the stack have T-171 fiber layer. The bending modulus of the resulting composite sheets was 900,000 psi and strength 9,500 psi.

What is claimed is:

1. A molded composite structure formed from a fiber reinforced resin matrix comprising: 30% to 40% by weight of polyethylene terephthalate reinforcing fibers having a denier per filament in the range of from 1.5 to 7 dpf and a cut length of from 1 to 2.5 inches and 60% to 70% by weight of resin matrix of a copolymer of polyethylene terephthalate and 12.5 mole % diethylene glycol, said molded structure having a Tensio'n Index of from 12 to 18, said structure having a molding temperature between the melting temperatures of the reinforcing fibers and the resin matrix.

* * * * *